D. DULL.

NUT-LOCK.

No. 7,306. Reissued Sept. 12, 1876.

*Witnesses:*

George F. Robinson

J. H. Dissel

*Inventor:*

Daniel Dull by Bradford Howland his Attorney.

N. PETERS, PHOTO-LITHOGRAPHER, WASHINGTON, D. C.

UNITED STATES PATENT OFFICE.

DANIEL DULL, OF SPRING TOWNSHIP, CRAWFORD COUNTY, PENNSYLVANIA.

IMPROVEMENT IN NUT-LOCKS.

Specification forming part of Letters Patent No. 176,429, dated April 25, 1876; reissue No. 7,306, dated September 12, 1876; application filed July 3, 1876.

*To all whom it may concern:*

Be it known that I, DANIEL DULL, of Spring township, Crawford county, Pennsylvania, have invented a Device for Locking the Nuts on Fish-Plates on Railroad-Rails, of which the following is a specification:

The object of my invention is to secure the nuts of the bolts that attach the fish-plates to railroad-rails by the pressure of a spring against a side of each nut, so that the spring and nuts mutually bind each other in such a manner that the jar of the rails caused by cars passing over them will not loosen the nuts, and so that, when desired, the nuts can be easily and quickly removed.

Figure 1:
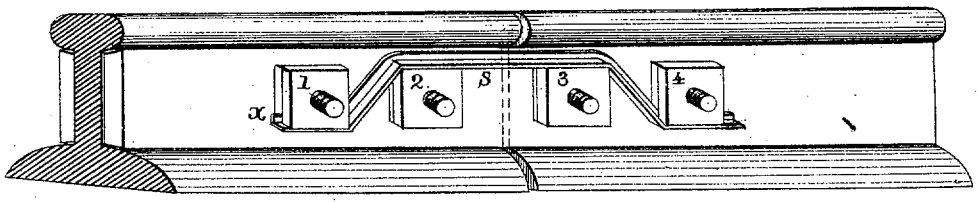
Figure 2:
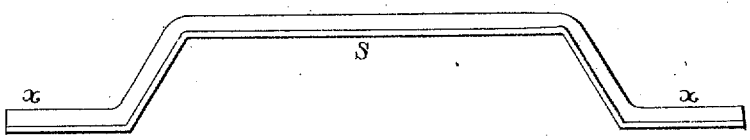

Figure 1 represents my device in place on the rail. Fig. 2 represents the same removed from the rail.

It is constructed as follows, to wit: The nuts 1 2 3 4 are screwed on the bolts in the usual manner. Between the face of each nut and the rail is placed a thick washer, of less diameter than the nuts. The steel spring *s* is shaped so that it will pass over the nuts 2 and 3 and under the nuts 1 and 4, as shown in Fig. 1, by pressing down the ends of the spring.

On the side of the spring *s* next the rail is a slight flange, *x*; and when the spring is in place this flange is behind the nuts, and prevents the spring from being moved from its position by the jar of the rails.

When the spring is in position, as shown in Fig. 1, it will be seen that the nuts cannot be turned until the spring is removed, which is done by bending the ends of the spring down until the flange is released from the nuts, when it can easily be removed.

I claim as my invention—

1. The spring *s*, so shaped that it may be placed between three or more nuts on both sides of the spring, and so that by its pressure against a side of each nut the spring and nuts are mutually bound, substantially as set forth.

2. The spring *s*, when constructed with the flange *x*, substantially as and for the purpose set forth.

DANIEL DULL.

Witnesses:
BRADFORD HOWLAND,
GEO. F. ROBINSON.